U.S. Patent Office 3,773,865
Patented Nov. 20, 1973

3,773,865
METHOD FOR SYNTHESIS OF AMINOPHOSPHINE SULFIDES
Henry Tolkmith, Midland, Mich., James N. Seiber, Davis, Calif., and Paul B. Budde, Midland, Mich., assignors to The Dow Chemical Company, Midland, Mich.
No Drawing. Continuation-in-part of abandoned application Ser. No. 604,153, Dec. 23, 1966. This application Oct. 22, 1969, Ser. No. 868,594
Int. Cl. A01n 9/36; C07f 9/24
U.S. Cl. 260—971     7 Claims

ABSTRACT OF THE DISCLOSURE

Optically active isomers of asymmetrical aminophosphine sulfides containing a P-imidazolyl radical and corresponding to the formula

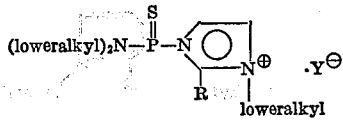

are employed as intermediates in preparing other optically active enantiomers of various organophosphorus compounds corresponding to the formula

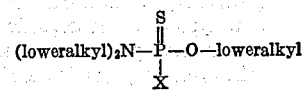

wherein the term "loweralkyl" represents an alkyl radical of from 1 to 4 carbon atoms, inclusive; Y represents an anion of an optically active camphorsulfonic acid, or an iodine, chlorine or bromine ion; R represents hydrogen or lower alkyl and X represents a radical of the formula

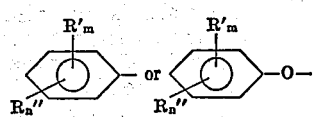

wherein R' represents loweralkyl or cyclohexyl; R" represents chloro, nitro or methyl mercapto; $m$ represents an integer of from 0 to 2, inclusive; $n$ represents an integer of from 0 to 3, inclusive; and the sum of $m+n$ represents an integer of from 0 to 3, inclusive.

CROSS REFERENCE TO RELATED APPLICATION

This application is a continuation-in-part of our copending application Ser. No. 604,153, filed Dec. 23, 1966, now abandoned.

BACKGROUND OF THE INVENTION

Asymmetrical organophosphorus compounds have been the subject of a considerable amount of interest. This interest arises, in a substantial part from the fact that a great number of organophosphorus compounds exhibit various biological activities, and many such compounds find commercially important application in animal health, crop raising, control of disease-carrying insects, and the like. Representative organophosphorus compounds include, for example, O-(2,4-dichlorophenyl) O-methyl N-isopropyl phosphoroamidothioate and O-(3,4-dichlorophenyl) O-ethyl phosphoroamidothioate taught to be useful as herbicides in U.S. Pat. No. 3,074,790; O-methyl N,N-diethyl phenyl phosphonamidothionate useful as a herbicide; O-(4-tert-butyl - 2 - chlorophenyl) O-methyl N-methyl phosphoroamidothioate taught to be useful as a parasiticide in U.S. Pat. No. 2,836,612; O,O'-bis-(2,4-dichlorophenyl)N,N' - dimethyl diamidodithiopyrophosphate taught to be useful as a herbicide and parasiticide in U.S. Pat. No. 3,155,707; and O-[p-(methylthio)-o-tolyl] O-methyl N-methyl phosphoramidothioate taught as a systemic parasiticide in U.S. Pat. No. 3,133,859.

More recently, as the field of organophosphorus chemistry has advanced, there has been increased attention to the mechanisms whereby the various organophosphorus compounds effect the biological activity exhibited. It is in this regard that attention is focused on those biologically active organophosphorus compounds in which the phosphorus atom is asymmetric. In particular, it has been questioned whether either of the enantiomers of such a substance might exhibit a pattern of activity different from the activity otherwise associated with the substance as its known and used racemic mixture; especially since such is true with other known racemic mixtures. Determination of this is dependent upon separation of the enantiomers of the racemic mixture and subsequent separate testing. However, resolution of such racemic mixtures has met with considerable difficulty, and only a few reactions have been developed. Such methods are, for example, taught by Aaron et al., J.A.C.S., vol. 80, pp. 107–110 and 456–458 (1958), vol. 82, pp. 596–598 (1960) and vol. 84, pp. 617–621 (1962); Coyne et al., J.A.C.S., vol. 78, pp. 3061–3063 (1956) and Marsi et al., J.A.C.S., vol. 78, pp. 3063–3066 (1956). Generally, these reactions require that the organophosphorus compound, e.g. an organophosphate, contain an acidic or basic group which can be reacted with an appropriate resolving agent. Such a group is not found in many commercially important organophosphates.

Moreover, even when the requisite acidic or basic group is present, many hitherto available resolving methods have been accompanied by limitations, such as difficult procedures and/or low yields, and, in the instance of certain resolved organochlorophosphates, extremely rapid racemization. Hence, new methods for the resolution of organophosphates are needed. Such methods have now been found.

SUMMARY OF THE INVENTION

The present invention is directed to a method of resolving and synthesizing asymmetrical organophosphorus compounds to separate the optically active enantiomer therefrom. The method involves reacting, either with or without resolution, an organophosphorus complex corresponding to the formula

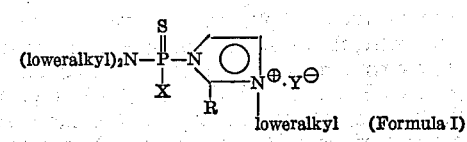

(Formula I)

with a compound of the formula M—O—R.

In these and succeeding formulae, the term "loweralkyl" represents an alkyl radical of from 1 to 4 carbon atoms, inclusive; Y represents an anion of an optically active camphorsulfonic acid or an iodine, chlorine or bromine ion; R represents hydrogen or loweralkyl and X represents a radical of the formula

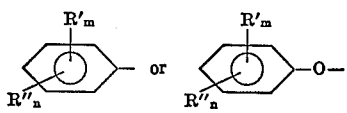

wherein R' represents loweralkyl or cyclohexyl; R" represents chloro, nitro or methyl mercapto; m represents an integer of from 0 to 2, inclusive; n represents an integer of from 0 to 3, inclusive; and the sum of $m+n$ represents an integer of from 0 to 3, inclusive; and M is an alkali metal from the group consisting of sodium, potassium and lithium. By the practice of the present invention there is obtained a product corresponding to the formula

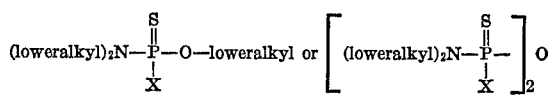

The identity of the anion (Y) in the starting complex (Formula I) is not at the heart of the present invention and hence is not critical. Representative and suitable anions include bromide, chloride, iodide, camphor-10-sulfonate and α-bromocamphor-π-sulfonate.

Representative M—O—R reactants include, for example, sodium hydroxide, potassium hydroxide, lithium hydroxide or sodium-, potassium- or lithium alkoxides such as the methoxide, ethoxide, propoxide or butoxide.

A general reaction scheme of the present process is as follows:

STEP I

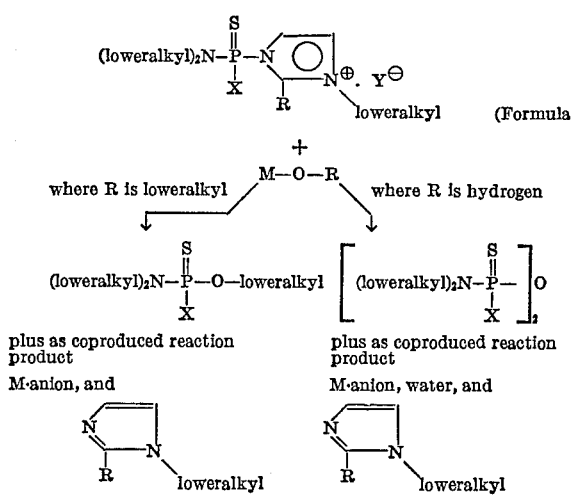

As indicated hereinbefore the starting complex exists as a racemic mixture and the reaction can be carried out with or without resolving the mixture. However, when it is desired to prepare the ultimate product in the form of one or both of its enantiomers, the starting complex is resolved employing conventional techniques, as for example, fractional crystallization from a suitable solvent such as, for example, benzene, cyclohexane or hexane. Thereafter, the separated components are each separately reacted with the M—O—R reagent to obtain the ultimate product. Reaction with the M—O—R reagent results in the breaking of the bond of the phosphorus atom to the nitrogen of the imidazolyl ring and the subsequent preparation of the ultimate product. This reaction occurs with essentially 100 percent inversion of the enantiomeric form of the asymmetric phosphorus atom. Thus, the ultimate product obtained in such procedures exists in an enantiomeric form which is the inverse of that of the starting material.

A general reaction scheme of the present process wherein resolution is employed is as follows:

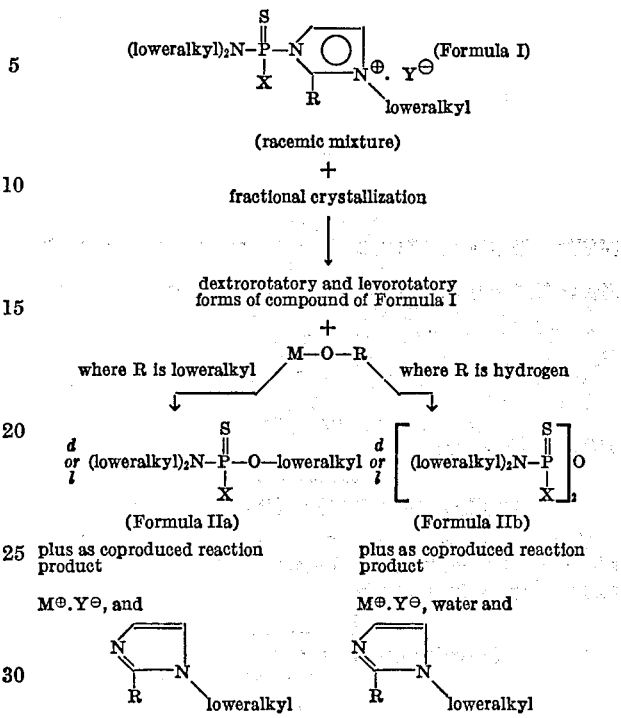

In carrying out the reaction, the starting complex, either as a racemic mixture or in its separated form, is contacted with the M—O—R reagent. This contacting is conveniently and preferably carried out in an inert liquid reaction medium, typically, an organic liquid. Suitable liquids include, for example, ethers, such as diethyl ether and 1,2-dimethoxyethane; the loweralkanols, such as methanol and ethanol; and aromatic and aliphatic hydrocarbons. However, in those instances wherein the M—O—R reagent is itself a liquid, an excess amount of that reactant is conveniently employed to serve as a reaction medium. The reaction goes forward under a wide range of temperatures, such as from about minus 20° to 120° C.; however, the reaction is conveniently and preferably carried out in a more narrow temperature range of from minus 20° to plus 30° C. The reaction consumes the reactants in amounts representing stoichiometric proportions of the reactants and better results are obtained when employing the reactants in only such amounts. Thus, where alkali metal hydroxide is employed (M—O—R, where R is H), the use of two molecular proportions of the starting complex and one molecular proportion of alkali metal hydroxide is preferred. Where alkali metal alkoxide is employed (M—O—R, where R is loweralkyl) it is preferred to use equal molecular proportions of the alkali metal alkoxide and the starting complex.

The reaction results in the preparation of the desired product and byproducts. The identity of the byproducts varies. As indicated hereinbefore, when R is H, the byproducts are

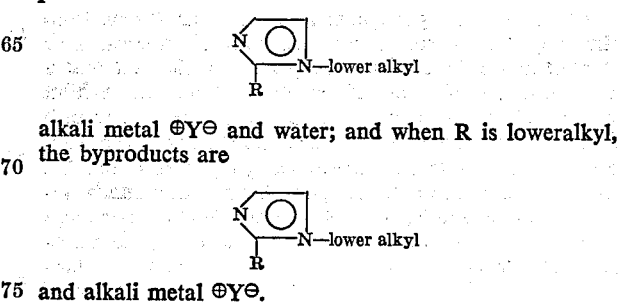

alkali metal $\oplus Y^\ominus$ and water; and when R is loweralkyl, the byproducts are and alkali metal $\oplus Y^\ominus$.

The product is separated from the reaction mixture and byproducts in conventional procedures. Typically, the reaction medium is removed by evaporation under subatmospheric pressure to obtain the product and byproducts as a residue; this product/byproduct residue is mixed with an organic solvent such as benzene to precipitate alkali salts, which are then removed by filtration. The mixture is further treated in conventional procedures to remove imidazole byproduct and/or imidazolium salt byproducts as formed. For example, washing with water can be employed in most instances to separate such byproduct or byproducts. Solvent is then removed, conveniently by evaporation under subatmospheric pressure, to obtain the desired product which can be further purified, if desired, in conventional procedures.

The following examples illustrate the present invention and will enable those skilled in the art to practice the same.

PREPARATION OF COMPOUNDS WHEREIN R IS LOWERALKYL

Example 1

(Diethylamino)2,4-dichlorophenoxy(2-methylimidazol-1-yl)phosphine sulfide 3-methylcamphorsulfonate (6.24 grams, 0.01 mole) is dissolved in methanol (15.0 milliliters) in a 250 milliliter 3-necked flask. The solution is stirred and cooled to 0°–5° C. Sodium methoxide (0.6 gram, 0.011 mole) is added, and the mixture stirred at 0°–5° C. for 2.0 hours. The reaction mixture is further diluted with benzene (100 milliliters) and methanol (100 milliliters). The insolubles are removed by filtration and discarded. The filtrate is concentrated, and the residue taken up in carbon tetrachloride, filtered and the filtrate concentrated to give a 42.7 percent yield of (diethylamino)2,4 - dichlorophenoxy(methoxy)phosphine sulfide (an oil). It is identified by nuclear magnetic resonance, infrared and mass spectroscopy analyses.

The same product is obtained in a 44.25 percent yield from (diethylamino)2,4 - dichlorophenoxy-(2 - methylimidazol-1-yl) 3-methyl iodide and sodium methoxide.

In an analogous manner and using the appropriate reactants as disclosed herein the following phosphoramidothionate diesters are obtained:

(diethylamino)phenoxy(ethoxy)phosphine sulfide; boiling at 120° C. at 0.4 millimeter of mercury.
(diethylamino)4-nitrophenoxy(ethoxy)phosphine sulfide; melting at 34° C.
(dimethylamino)4 - nitrophenoxy(ethoxy)phosphine sulfide; boiling at 153–155° C. at 0.2 millimeter of mercury.
(dimethylamino)4 - methylthio - phenoxy(ethoxy)phosphine sulfide; boiling at 113° C. at 0.01 millimeter of mercury.
(dimethylamino)4 - methylthio-phenoxy(methoxy) phosphine sulfide; boiling at 136° C. at 0.01 millimeter of mercury.

Example 2

(Diethylamino)phenyl(2-methylimidazol - 1 - yl)phosphine sulfide 3-methyl iodide (10.9 grams; 0.025 mole) is mixed with 75 milliliters of methanol and the resulting mixture cooled to a temperature of 0° C. Thereafter, there is added to the mixture a solution of potassium methoxide (1.0 gram; representing 0.0255 mole of potassium) in 30 milliliters of methanol. The addition is carried out portionwise over a period of thirty minutes, and the resulting reaction mixture held for an additional thirty minutes at 0° C., and at room temperature for 1 hour, with stirring throughout the entire period. Methanol is removed from the reaction mixture by evaporation under subatmospheric pressure; and the residue resulting is dissolved in 125 milliliters of benzene. This benzene solution is filtered to separate potassium iodide and subsequently extracted with four successive 30-milliliter portions of water to remove 1,2-dimethylimidazole and dried over sodium sulfate. Benzene is removed from the dried solution by evaporation under subatmospheric pressure to obtain the desired methoxy(diethylamino)phenyl phosphine sulfide product as a residue. This product residue is dispersed in 50 milliliters of benzene and the resulting solution extracted with four successive 20-milliliter portions of water. The solution is treated with charcoal and dried over sodium sulfate; benzene is removed by evaporation under subatmospheric pressure to obtain the desired product in a purified form. The product so obtained is a light colorless oil. Elemental analysis and nuclear magnetic resonance analysis confirms the identity of the product.

Example 3 l-(Diethylamino)phenyl(2 - methylimidazol - 1 - yl) phosphine sulfide 3-methyl iodide and potassium methoxide are reacted together in methanol, employing essentially the same procedures as those employed in Example 2. The expected d-methoxy(diethylamino)phenyl phosphine sulfide product is found to be a light colorless oil having a specific rotation of $[\alpha]_D^{25}$ +73.4° (at a concentration of 1.4 grams per 100 milliliters of chloroform).

PREPARATION OF COMPOUNDS WHEREIN R IS HYDROGEN

Example 4 dl-(Diethylamino)phenyl(2-methylimidazol - 1 - yl) phosphine sulfide 3 - methyl iodide (6.35 grams; 0.015 mole); a solution of sodium hydroxide (0.610 gram; 0.0152 mole) in 50 milliliters of water; and 100 milliliters of benzene are mixed at room temperature and held at room temperature, with stirring, for twenty hours. Thereafter, the layers are permitted to separate and the aqueous layer extracted with two successive 25-milliliter portions of benzene. The benzene portions are combined and extracted with two successive 15-milliliter portions of water, dried and the benzene removed by evaporation to obtain the desired dl-oxybis[(diethylamino)phenyl phosphine sulfide]product as a residue. This product residue is purified by recrystallizing it twice from a hexane-type petroleum solvent. The product obtained as a result of these operations melts at 86–100° C. The identiy of the product is confirmed by nuclear magnetic resonance analysis.

Example 5 l-(Diethylamino)phenyl(2 - methylimidazole - 1 - yl) phosphine sulfide 3-methyl iodide (2.2 grams; 0.005 mole) and sodium hydroxide (0.203 gram; 0.005 mole) are reacted together. The reaction is carried out as reported in the preceding example except that only one recrystallization from the hexane type petroleum solvent is carried out. The product thus obtained melts at 83–85° C. and has a specific rotation of $[\alpha]_D^{25}$ +109° (at a concentration of 1.1 grams per 100 milliliters of chloroform). The nuclear magneticresonance spectrum of this product is consistent with the expected identity. Expansion of the spectrum in the region of 0.5–1.5 shows the presence of 2 triplets in the approximate ratio, by planimetry integration, of 10.3/1. Correcting for a small amount of dimethylimidazole impurity and the amount of d-isomer already removed by crystallization, the ratio of dl:meso in the product is calculated to be 93/7, that is, the product contains 86 percent of the d-form, 7 percent of the l-form, and 7 percent of the meso form.

All of the products of the above Examples 1–5 have been found to be effective pesticides.

PREPARATION OF STARTING MATERIALS

The complex employed as a starting material is prepared by reacting a compound of the formula

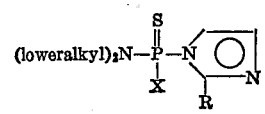

wherein loweralkyl, X and R are as hereinbefore defined; with a loweralkyl ester of an optically active camphorsulfonic acid (Y), conveniently in a solvent such as ether, acetone or a secondary alkanol, at a temperature of from 0 to 100° C. to obtain the complex of the formula

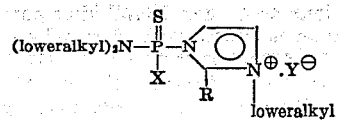

Those complexes wherein Y is iodide, chlorine or bromine are prepared by contacting the above complex with an appropriate alkali metal halide at a temperature of about 50° C. for about 30 minutes. This reaction converts the complex wherein Y is a camphorsulfonate to a complex wherein Y is a halogen.

The compounds to be employed as starting materials for the complex in accordance with the present invention:

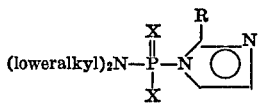

are prepared by reacting an imidazole reactant:

with an appropriate phosphorus compound, which is of the following formula:

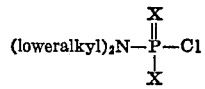

The reaction of imidazole reactant and phosphorus compound is carried out in the presence of a hydrogen chloride acceptor and in the presence of an inert liquid reaction medium. The imidazole reactant can be employed as the hydrogen chloride acceptor. Good results are obtained when operating at temperatures of from 15° to 60° C. and when employing stoichiometric proportions of the reactants and of hydrogen chloride acceptor.

The alkyl camphorsulfonates used as starting materials in preparing the complex are all well-known compounds and can be conveniently prepared by the method taught in J. Chem. Soc. 97, pp. 223–231 (1910) or J. Indian Chem. Soc., 35, pp. 49–52 (1958), whereby equivalent amounts of an alkali metal alkyl oxide is heated with an appropriate camphorsulfonyl halide in the respective alcohol.

All of the M—O—R reactants are all well-known materials.

What is claimed is:

1. A method for the synthesis of an aminophosphine sulfide which comprises reacting a racemic complex corresponding to the formula

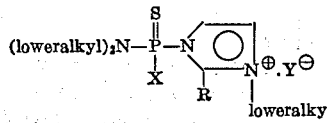

with an alkali metal alkoxide of the formula M—O-loweralkyl at a temperature in the range of from about minus 20° to 120° C. to obtain a product compound of the formula

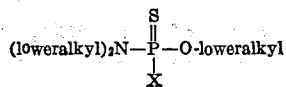

wherein the term "loweralkyl" represents an alkyl radical of from 1 to 4 carbon atoms, inclusive; Y represents an anion of an optically active camphorsulfonic acid, or an iodine, chlorine or bromine ion; R represents hydrogen or loweralkyl and X represents a radical of the formula

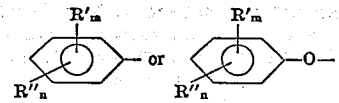

wherein R' represents loweralkyl or cyclohexyl; R" represents chloro, nitro or methyl mercapto; m represents an integer of from 0 to 2, inclusive; n represents an integer of from 0 to 3, inclusive; the sum of $m+n$ represents an integer of from 0 to 3, inclusive; and M is an alkali metal of the group of sodium, potassium and lithium.

2. The method of claim 1 wherein the alkali metal alkoxide is sodium methoxide.

3. The method of claim 1 wherein the product compound is (diethylamino)2,4-dichlorophenoxy(methoxy)phosphine sulfide.

4. The method of claim 1 wherein the product compound is (diethylamino)phenyl(methoxy)phosphine sulfide.

5. A method for the synthesis of enantiomeric aminophosphine sulfides which comprises fractionally crystallizing a racemic mixture of a complex corresponding to the formula

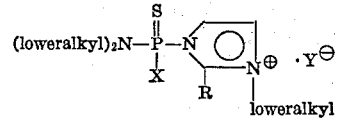

whereby the mixture is resolved into its dextrorotatory and levorotatory forms and separately reacting each of said dextrorotatory and levorotatory forms of said complex with an alkali metal alkoxide of the formula M—O-loweralkyl at a temperature of from about minus 20° to 120° C. to obtain as the product, the corresponding enantiomer of the compound of the formula

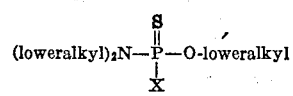

wherein the term "loweralkyl" represents an alkyl radical of from 1 to 4 carbon atoms, inclusive; Y represents an anion of an optically active camphorsulfonic acid, or an iodine, chlorine or bromine ion; R represents hydrogen or loweralkyl and X represents a radical of the formula

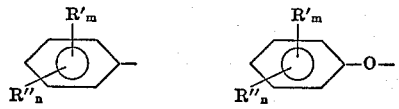

wherein R' represents loweralkyl or cyclohexyl; R" represents chloro, nitro or methyl mercapto; m represents an integer of from 0 to 2, inclusive; n represents an integer of from 0 to 3, inclusive; the sum of $m+n$ represents an integer of from 0 to 3, inclusive; and M is an alkali metal of the group of sodium, potassium and lithium.

References Cited
UNITED STATES PATENTS 3,185,721   5/1965   Schrader _____ 260—971

ANTON H. SUTTO, Primary Examiner

U.S. Cl. X.R.

71—87; 260—309.6, 933, 959, 988, 989; 424—220